United States Patent
Bax et al.

Patent Number: 6,150,011
Date of Patent: Nov. 21, 2000

[54] MULTI-LAYER HEAT-SHRINKAGE FILM WITH REDUCED SHRINK FORCE, PROCESS FOR THE MANUFACTURE THEREOF AND PACKAGES COMPRISING IT

[75] Inventors: Serge Bax, Pogliano Milanese; Paolo Ciocca, Lumellogno, both of Italy; Edward Lee Mumpower, Moore, S.C.

[73] Assignee: Cryovac, Inc., Duncan, S.C.

[21] Appl. No.: 08/357,487

[22] Filed: Dec. 16, 1994

[51] Int. Cl.⁷ .................................................. B32B 33/00
[52] U.S. Cl. .......................... 428/215; 428/516; 428/518; 428/910
[58] Field of Search .................. 428/215, 516, 428/518, 910

[56] References Cited

U.S. PATENT DOCUMENTS

| | | | |
|---|---|---|---|
| 3,595,735 | 7/1971 | Tyrell | 161/162 |
| 3,645,992 | 2/1972 | Elston | 260/80 |
| 3,741,253 | 6/1973 | Brax et al. | 138/137 |
| 4,064,296 | 12/1977 | Bornstein et al. | 428/35 |
| 4,161,562 | 7/1979 | Yoshikawa et al. | 428/215 |
| 4,188,443 | 2/1980 | Mueller et al. | 428/216 |
| 4,194,039 | 3/1980 | Mueller | 428/213 |
| 4,278,838 | 7/1981 | Antonov | 179/1 SM |
| 4,284,458 | 8/1981 | Schirmer | 156/244 |
| 4,302,565 | 11/1981 | Goeke | 526/88 |
| 4,302,566 | 11/1981 | Karol et al. | 526/125 |
| 4,352,849 | 10/1982 | Mueller | 428/213 |
| 4,399,173 | 8/1983 | Anthony et al. | 428/35 |
| 4,399,180 | 8/1983 | Briggs et al. | 428/212 |
| 4,457,960 | 7/1984 | Newsome | 428/35 |
| 4,514,465 | 4/1985 | Schoenberg | 428/339 |
| 4,532,189 | 7/1985 | Mueller | 428/516 |
| 4,551,380 | 11/1985 | Schoenberg | 428/218 |
| 4,590,124 | 5/1986 | Schoenberg | 428/339 |
| 4,724,185 | 2/1988 | Shah | 428/339 |
| 4,726,984 | 2/1988 | Shah | 428/216 |
| 4,755,419 | 7/1988 | Shah | 428/220 |
| 4,833,024 | 5/1989 | Mueller | 428/349 |
| 4,837,084 | 6/1989 | Warren | 428/349 |
| 4,839,235 | 6/1989 | Shah | 128/516 |
| 5,004,647 | 4/1991 | Shah | 428/349 |
| 5,023,143 | 6/1991 | Nelson | 428/516 |
| 5,272,236 | 12/1993 | Lai et al. | 526/348 |
| 5,278,272 | 1/1994 | Lai et al. | 526/348 |

FOREIGN PATENT DOCUMENTS

| | | |
|---|---|---|
| 008708 | 9/1983 | European Pat. Off. |
| 0092897 | 11/1983 | European Pat. Off. |
| 0141555 | 5/1985 | European Pat. Off. |
| 0229715 | 7/1987 | European Pat. Off. |
| 0285444 | 10/1988 | European Pat. Off. |
| 54-155282 | 12/1979 | Japan |
| 62-198456 | 9/1987 | Japan |
| 1605181 | 1/1978 | United Kingdom |
| 22269 | 2/1990 | United Kingdom |
| 94/07954 | 4/1994 | WIPO |
| 94/23945 | 4/1994 | WIPO |

OTHER PUBLICATIONS

US Unrestrained Linear . . . ASTM D2732 368–371.
US Haze & Luminous . . . ASTM D 1003–61 358–362.
US Specular Gloss of . . . ASTM D–2457 13–17.

*Primary Examiner*—Stevan A. Resan
*Attorney, Agent, or Firm*—Mark B. Quatt

[57] ABSTRACT

A heat-shrinkable film comprising a core layer comprising an ethylene-vinyl alcohol copolymer, two outer layers of blends comprising ethylene-vinyl acetate and ethylene-α-olefin copolymers, and two adhesive layers, characterized in that said film has a free shrink of at least 40%, preferably at least 45% and most preferably at least 50%, in both dimensions at 120° C. and a maximum shrink force in the transversal direction, throughout its range of shrink temperatures, not exceeding 0.5. N/cm. The film is suitable to package deformable articles such as trays to give a tight package without causing deformation.

9 Claims, 1 Drawing Sheet

MULTI-LAYER HEAT-SHRINKAGE FILM WITH REDUCED SHRINK FORCE, PROCESS FOR THE MANUFACTURE THEREOF AND PACKAGES COMPRISING IT

FIELD OF THE INVENTION

The present invention relates to a multi-layer heat-shrinkable film showing a specific shrink behavior suitable for use as a packaging film. The present invention is also related to a process of making such a film and to packages comprising it.

BACKGROUND OF THE INVENTION

Heat-shrinkable multilayer films comprising a core layer comprising an ethylene-vinyl alcohol copolymer, two outer layers comprising blends of ethylene-α-olefin copolymers and ethylene-vinyl acetate copolymers, and two adhesive layers, are known.

As an example U.S. Pat. No. 4,457,960 discloses the use of ethylene-vinyl alcohol copolymers and blends thereof in a multi-layer film which may be heat-shrinkable and comprise blends of ethylene-α-olefin copolymers and ethylene-vinyl acetate copolymers in the outer layers.

EP-A-87,080 relates to films having the above general structure and characterized by the fact that the ratio of the weight of the ethylene-vinyl acetate copolymer to the total weight of the polymers of the two outer layers is higher than 0.4.

EP-A-141,555 discloses an oriented five-layer film having a core layer of a blend of an ethylene-vinyl alcohol copolymer and nylon or nylon copolymer, two adhesive layers and two surface layers of a blend of ethylene-α-olefin copolymers and ethylene-vinyl acetate copolymers.

EP-A-217,596 describes a heat-shrinkable multilayer film comprising a cross-linked core layer comprising a blend of an ethylene-vinyl alcohol copolymer and a polyamide resin, two cross-linked inner layers each comprising an adhesive resin, and two cross-linked surface layers each comprising a three component blend of an ethylene-α-olefin copolymer of low density, an ethylene-α-olefin copolymer of medium density and an ethylene-vinyl acetate copolymer.

A general method of manufacture of the heat-shrinkable films, including the above ones, involves the co-extrusion of a thick tubular shape laminate film (called "tape") which is quenched just under the die, collapsed by a pair of nip rolls and then heated to a predetermined temperature above the glass transition temperature (Tg) but below the melting temperature of the composition and stretched in both the longitudinal (machine) and the transverse directions to get a cylindrically-shaped laminate thin film. After being so stretched the film is rapidly cooled to somehow freeze-in the resulting film a latent shrinkability. The film thus obtained, when heated to a temperature close to the temperature at which it has been stretched (or oriented) under conditions where nil or negligible restraint to inhibit shrinkage is present, will exhibit a rapid and irreversible reduction in its linear dimensions.

All the heat-shrinkable multilayer films indicated above are claimed to have very good properties in terms of oil-resistance, peel-resistance, gas-barrier, optics and shrink properties, the combination of which is highly desirable in the field of food packaging.

Most of these remarkable properties are peculiar to the specific compositions, the sequence of the layers and the thicknesses thereof. Some of them depend on a specific layer while others on the specific combination of layers. As an example, oil resistance is mainly ascribable to the presence of an ethylene-α-olefin component, in the outer layers, while the gas-barrier properties depend on the presence of an ethylene-vinyl alcohol copolymer in the core layer and, owing to the moisture susceptibility of this copolymer, also on the presence of moisture impermeable outer layers.

As far as the shrink properties are concerned, these will however depend on both the composition of the films and the process of manufacture involved in their production. As a matter of fact the stretching or orientation in the different directions may be imposed on the films in varying degrees and the shrink which will be recovered will clearly depend on that.

In general, it is however possible with the above compositions, by properly adjusting the manufacturing process parameters, to get films with a very high free shrink compared to other compositions. A particularly high free shrink is one of the key attributes of a film for food packaging as it provides the package with a skin-tight wrapping, which remarkably improves the appearance of the package and enhances the commercial value of its content.

To exploit all the above properties, the above films should have a thickness of at least 15 $\mu$, preferably at least 18 $\mu$, wherein the thickness of the gas-barrier layer is at least 3 $\mu$, preferably at least 4 $\mu$, and an orientation ratio, i.e., the multiplication product of the extent to which the tape is expanded in two directions perpendicular to one another, of at least 2×2, and preferably at least 2.5×2.5 to provide the desired high free shrink.

However coupled with such a high free shrink these films also show a very high shrink force, i.e. during the shrinking process they release a very high force.

In some cases, and chiefly when these films are employed for packaging soft articles, a high shrink force, particularly in one direction, may create severe problems as it may lead to a distortion of the packaged articles.

As an example, a typical application of the heat-shrinkable multilayer films having a core layer comprising an ethylene-vinyl alcohol copolymer, two outer layers of blends comprising ethylene-vinyl acetate and ethylene-α-olefin copolymers, and two adhesive layers, such as for instance those films marketed by Cryovac® under the tradename BDF, is in the modified atmosphere packaging (MAP) of food products placed on trays or otherwise flexible lower support members.

Briefly, in this packaging system, the food product in the tray is wrapped into a film envelope under a gas flushing. The excess gas is removed from the envelope by means of a slight pressure on top of the package (to avoid the ballooning effect during shrinkage), the open end of the envelope is then sealed, and the loose package is passed into a hot air shrink tunnel set at a temperature of from 140 to 160° C., for a short time sufficient to let the film reach a temperature of about 120±10° C., to provide a tight package. Under these conditions the known films will shrink by at least 40% in both dimensions but at the same time they will release a very high shrink force. Depending on the strength of the tray employed, the high shrink tension in the transverse direction may lead to a more or less severe distortion of the tray that in any case impairs the package appearance.

Another typical application for this type of barrier films is in the MAP packaging of food products, such as pizzas, wherein the pizza base acts as the package support. The same packaging process is used with the only difference that there is no tray.

It has been found that for these types of application, in view of the trays currently available on the market, a suitable shrink force in the transverse direction should not exceed 0.5 N/cm, in order to control distortion of the tray or of the product.

One possible solution to this problem would involve a modification of the parameters of the orientation step in the process for the manufacture of the films. In this way the reduction in transverse shrink force would bring about also an undesirable and remarkable reduction in the free shrink of the end films.

An alternative solution might provide for the reduction of the film thickness below 15 $\mu$, with an obvious consequent reduction of the film barrier and mechanical properties.

As a third alternative solution a modification of the composition of these films might be envisaged with the aim at getting films with a reduced shrink force, but this would clearly bring about a modification also of the other properties of the films which on the contrary have been optimized in the above structures.

SUMMARY OF THE INVENTION

It is therefore an object of the present invention to provide a multilayer, heat-shrinkable film endowed with very good oil-resistance, peel-resistance, gas-barrier, and optical properties, a high free shrink and a reduced shrink force.

It is a special object of the present invention to provide a heat-shrinkable film of the above mentioned type which is suitable to package deformable articles, such as trays, to give a tight package without causing deformation.

It has now been found that it is possible to accomplish the foregoing objects, by selectively reducing the maximum shrink force of a heat-shrinkable film comprising a core layer comprising an ethylene-vinyl alcohol copolymer, two outer layers of blends comprising ethylene-vinyl acetate and ethylene-α-olefin copolymers, and two adhesive layers, without substantially altering the free shrink thereof at the temperatures conventionally used in the shrinking process or the mechanical and optical properties of the film, by submitting said film to a heat treatment under strictly controlled conditions.

DETAILED DESCRIPTION OF THE INVENTION

Figure 1:
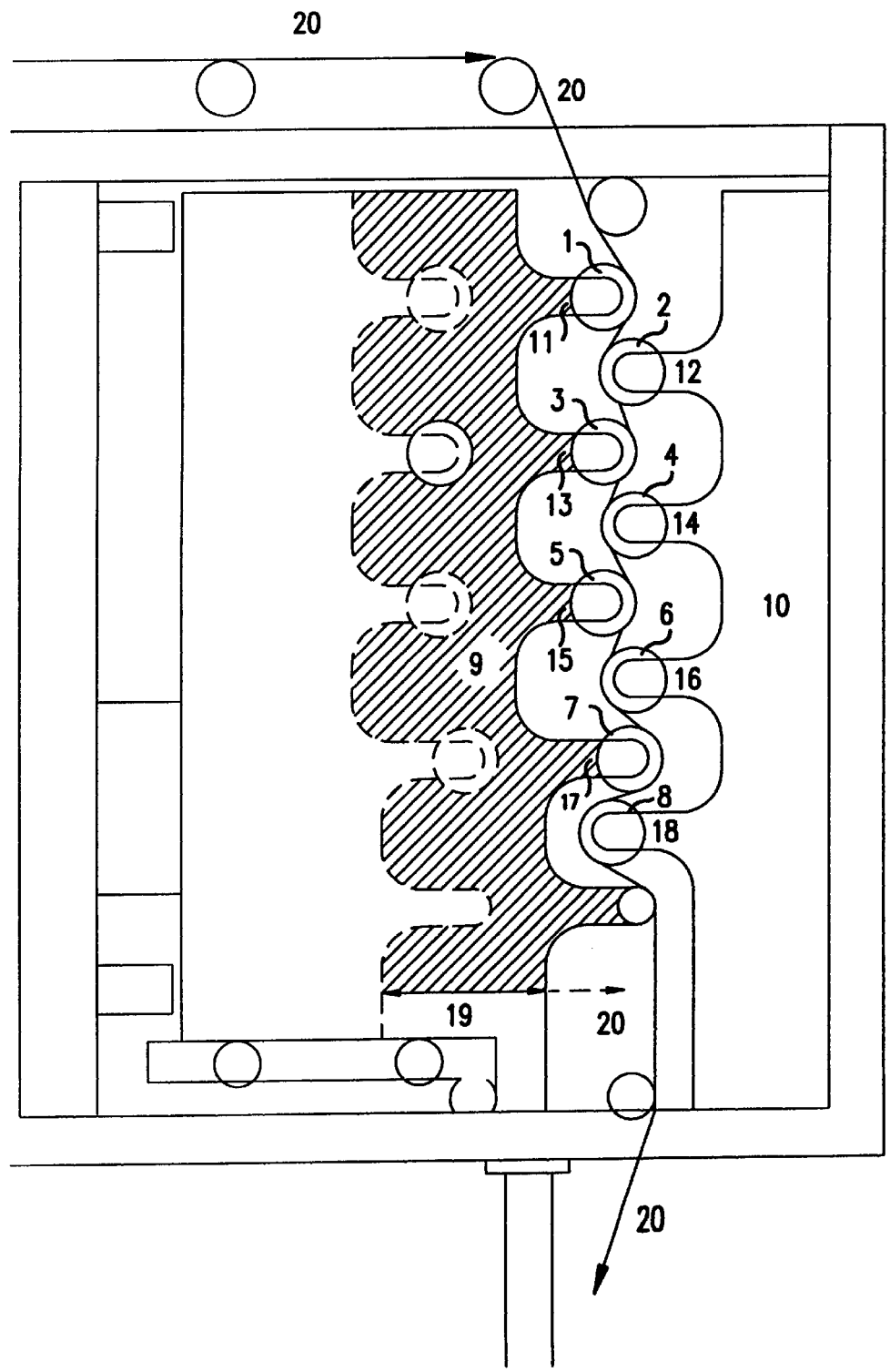

A first object of the present invention is therefore a heat-shrinkable film comprising a core layer comprising an ethylene-vinyl alcohol copolymer, two outer layers of blends comprising ethylene-vinyl acetate and ethylene-α-olefin copolymers, and two adhesive layers, characterized in that said film has a free shrink of at least 40%, preferably at least 45% and most preferably at least 50%, in both dimensions at 120° C. and a maximum shrink force in the transverse direction, throughout its range of shrink temperatures, not exceeding 0.5 N/cm.

For purposes of the present application the term "film" is used in a generic sense to include any flat and flexible material having a thickness of between about 15 and about 150 $\mu$. Preferably, however said term is intended to refer to flat and flexible materials having a thickness of from about 18 up to about 90 $\mu$, more preferably of from about 18 up to about 40 $\mu$ and even more preferably of from about 20 to about 35 $\mu$.

By biaxially oriented heat-shrinkable film is meant a film which has been drawn, at a temperature above the glass transition temperature (Tg) but below the melting temperature of the polymers, in two mutually perpendicular directions in the plane of the film to induce molecular orientation therein. The orientation in the two directions may be balanced or the film may be more highly oriented in a preferred direction than in the other. The orientation in the two directions is typically carried out simultaneously by a so-called "bubble" process.

The term "core" or "core layer", refers to any internal film layer which has a primary function other than serving as an adhesive or compatibiliser for adhering two layers to one another. The core layer as used in the present application provides the multilayer film with the desired gas barrier properties. As indicated said core layer will comprise an ethylene-vinyl alcohol copolymer (EVOH), wherein said term refers to saponified products of ethylene-vinyl ester copolymers, generally of ethylene-vinyl acetate copolymers, wherein the ethylene content is typically comprised between 20 and 60% by mole and the degree of saponification is generally higher than 85 and preferably higher than 95%. The ethylene-vinyl alcohol copolymer can be employed alone or blended with other EVOHs, ethylene-vinyl acetate copolymers, ionomers or, preferably with one or more polyamides.

As used herein the term "outer layer" refers to either one of the two outermost layers of the multi-layer film which in the end package will be in contact with the food or with the environment.

The term "adhesive layer" refers to an internal layer having the primary function of adhering two layers to one another. They will be comprised of materials which provide structural integrity to the multilayered barrier structure without substantially affecting the barrier properties of the gas-barrier layer or the mechanical and physical properties of the outer layers. Typically said adhesive layer will comprise modified polyolefins.

The terms "polymer" or "polymer resin" generally include but are not limited to, homopolymers, copolymers, such as for instance, block graft, random, and alternating copolymers, etc. as well as blends and modifications thereof.

The term "copolymer" as used herein is intended to denote polymers of two or more comonomers. Therefore, although the present specification generally refers to ethylene-α-olefin copolymers, such term is intended to encompass copolymers of ethylene with one or more α-olefins or of ethylene with an α-olefin and other comonomer.

The term "polyolefin" refers to a thermoplastic resin obtained by polymerisation of an olefin or by copolymerisation of two or more olefins or of one or more olefins with other comonomers, wherein the olefin units are anyway present in larger amounts than any possibly present comonomer. Suitable examples of "polyolefins" are ethylene-α-olefin copolymers, ethylene-vinyl acetate copolymers ethylene-acrylic acid or methacrylic acid copolymers, ethylene-propoylene copolymers, ethylene-propoylene-butylene copolymers, and the like.

The term "modified polyolefin" means a polyolefin characterized by the presence of functional groups such as typically anhydride or carboxy groups. Examples of said modified polyolefins are graft copolymers of maleic acid or anhydride onto ethylene-vinyl acetate copolymers, graft copolymers of fused ring carboxylic anhydrides onto polyethylene, resin mixtures of these and mixtures with polyethylene or ethylene-α-olefin copolymers.

The term "ethylene-α-olefin copolymer" designates a copolymer of ethylene with one or more ($C_4$–$C_8$)-α-olefin preferably selected from the group consisting of copolymers or terpolymers of ethylene with 1-butene, 4-methyl-1-pentene, 1-hexene, and 1-octene. Ethylene-α-olefin copolymers can be prepared using Ziegler-Natta or metallocene single site (constrained geometry) catalyst. The heterogeneous ethylene-α-olefin copolymers prepared using Ziegler-Natta catalysts are generally classified as linear low density polyethylene (LLDPE), having a density usually in the range of from about 0.915 g/cc to about 0.925 g/cc, linear medium density polyethylene (LMDPE), having a density usually in the range of from about 0.926 to about 0.941 g/cc, and very low density polyethylene (VLDPE), having a density lower than 0.915 g/cc.

The term "ethylene-vinyl acetate copolymer" (EVA) as used herein refers to a copolymer formed from ethylene and vinyl acetate monomers wherein the ethylene derived units in the copolymer are present in major amounts and the vinyl acetate derived units in the copolymer are present in minor amounts.

The term "ionomers" refers to a copolymer of ethylene with a copolymerizable ethylenically unsaturated acidic monomer, usually an ethylenically unsaturated carboxylic acid which may be di- or more basic but is generally mono-basic, for example acrylic or methacrylic acid. The term "ionomer" generally cover such polymers in their free acid form as well as their ionized form. Preferably however it is in the ionized form, the neutralizing cation being any suitable metal ion for example an alkali metal ion, zinc ion, or other multivalent metal ions.

The term "polyamide" means a high molecular weight polymer having amide linkages, and as used herein it refers more specifically to synthetic polyamides, either aliphatic or aromatic, either in crystalline or amorphous form. It is intended to refer to both polyamides and co-polyamides. Exemplary of such polyamides are those polymers commonly referred to as e.g. nylon 6, nylon 66, nylon 6-66, nylon 610, nylon 12, nylon 69, and nylon 6-12.

In a preferred embodiment the present invention refers to a heat-shrinkable film comprising a core layer essentially consisting of ethylene-vinyl alcohol copolymer(s) optionally blended with polyamide(s), two outer layers of blends comprising ethylene-vinyl acetate and ethylene-α-olefin copolymers, and two adhesive layers, characterized in that said film has a free shrink of at least 40%, preferably at least 45% and most preferably at least 50%, in both dimensions at 120° C. and a maximum shrink force in the transversal direction, throughout its range of shrink temperatures, not exceeding 0.5 N/cm.

In a more preferred embodiment the present invention refers to a heat-shrinkable film comprising a core layer essentially consisting of ethylene-vinyl alcohol copolymer(s) optionally blended with polyamide(s), two outer layers of blends essentially consisting of ethylene-vinyl acetate copolymer, and one or more ethylene-α-olefin copolymers of differing densities, and two adhesive layers, characterized in that said film has a free shrink of at least 40%, preferably at least 45% and most preferably at least 50%, in both dimensions at 120° C. and a maximum shrink force in the transversal direction, throughout its range of shrink temperatures, not exceeding 0.5 N/cm.

In an even more preferred embodiment the present invention refers to a heat-shrinkable film comprising a core layer essentially consisting of a blend of ethylene-vinyl alcohol copolymer(s) with polyamide(s), two outer layers essentially consisting of a blend of an ethylene-vinyl acetate copolymer, an ethylene-α-olefin copolymer of low density (LLDPE) and an ethylene-α-olefin copolymer of medium density (LMDPE), and two adhesive layers, characterized in that said film has a free shrink of at least 45% and preferably at least 50%, in both dimensions at 120° C. and a maximum shrink force in the transversal direction, throughout its range of shrink temperatures, not exceeding 0.5 N/cm.

In a most preferred embodiment the present invention refers to a heat-shrinkable film comprising a cross-linked core layer essentially consisting of a blend of ethylene-vinyl alcohol copolymer with up to 20% by weight of a polyamide, two outer cross-linked layers essentially consisting of a blend of an ethylene-vinyl acetate copolymer, an ethylene-α-olefin copolymer of low density (LLDPE) and an ethylene-α-olefin copolymer of medium density (LMDPE), and two cross-linked adhesive layers, characterized in that said film has a free shrink of at least 45%, and preferably at least 50%, in both dimensions at 120° C. and a maximum shrink force in the transversal direction, throughout its range of shrink temperatures, not exceeding 0.5 N/cm.

As used herein the term "essentially consisting of" clearly does not exclude the presence of additives, conventionally used in this field, that are added to the resins in very small amounts with the aim at improving the polymer processability or the end film performance. Exemplary of such additives are for instance plasticisers (for the core layer), antioxidizers, slip and antiblock agents, UV absorbers, pigments, antifog agents or compositions, antimicrobial agents, cross-linking agents, oxygen scavenging agents or compositions used to improve the film barrier properties, and the like agents. Also, this term should not exclude the presence of minor amounts of different resins or blends of resins coming for instance from the recycle of polymer scrap material, as far as these minor amounts do not substantially alter the film attributes and performance.

As indicated above a general process used for the manufacture of the starting films involves coextruding the different polymers through a round die of suitable dimensions, quickly quenching the thus obtained thick tubular film just below the die, reheating said tape to a suitable temperature, and biaxially orienting it by inflation of air to achieve the transverse orientation and by a differential speed of the pinch rolls which hold the bubble to achieve the longitudinal orientation.

Alternatively the starting films can also be prepared by extrusion coating wherein the multilayer tube is formed by extruding or co-extruding a first tape (called the primary tape) and then coating said tape with the other layers which are either sequentially extruded or in a single step coextruded thereon.

If the starting film has to be cross-linked, this is generally achieved by submitting the film to an energetic radiation treatment, typically by high energy electron treatment. In such a case irradiation is most preferably performed prior to orientation. Radiation dosages are referred to herein in terms of the radiation units "Grays", with one thousand Grays being designated as "KGrays". A suitable radiation dosage of high energy may be in the range of up to about 120 KGrays, more preferably from about 20 to about 90 KGrays.

In line of principle however if the whole film has to be irradiated, the irradiation step can be carried out also after orientation.

If only some of the layers of the films need to be irradiated, the irradiation step will be carried out on the primary tape.

Alternatively chemical cross-linking of the resins can be achieved by the addition of suitable cross-linking agents, e.g. peroxides, to the resins to be cross-linked or a combination of chemical cross-linking and irradiation can be used where the cross-linking agents added to the resins need some irradiation to trigger the cross-linking reaction.

In order to get the films according to the present invention the films obtained as described above are subjected to a heat treatment under strictly controlled conditions.

Heat treatment of thermoplastic structures, such as annealing or heat-setting, are widely known processes in the field of plastic materials.

The annealing process is defined as a heat-treatment process aiming at the removal of strains and stresses set up in the material during its forming and fabricating operations.

Typically the plastic is brought to a certain temperature called the annealing temperature, kept at this temperature for a definite period of time, and then slowly cooled to room temperature. The key effect of the annealing process is therefore to improve the dimensional stability of the polymer when exposed to elevated temperatures. Furthermore annealing frequently improves the impact strength and prevents cracking of excessively stressed items. This process is therefore widely used when a maximum dimensional stability or the enhancement of certain properties of the articles for specific applications are required in injection molding, blow molding, extrusion of heavy sheet or film extrusion.

In the field of film extrusion, and more particularly in the field of polypropylene films, the films are very often drawn to cause molecular orientation therein and thereby improve the film physical properties and then subjected to a heat-treatment, called heat-setting, where the films, while restrained against shrinkage, are heated at a temperature above the glass transition temperature of the polymers and below their melting points, to stabilize the molecules in the oriented state and eliminating almost completely the shrinkage while retaining the improved mechanical properties.

In the field of heat-shrinkable films, where a change in dimensions upon heating is one of the key desirable feature of the film, heat-treatments of the films before shrinkage are rarely described or used.

When such treatments are described in the literature they are aimed at improving the film dimensional stability or at increasing film planarity at the storage temperatures.

As an example GB-A-2,221,649 that is directed to a polyolefin film which, just owing to its specific stricture (i.e. the specific polymers used for the core and for the outer layers and their ratio) exhibits a low shrink force, describes a heat-treatment of the film at low temperatures to avoid spontaneous shrinkage when the film is allowed to stand as it is.

The heat treatment suitable to obtain the films according to the present invention involves heating the film obtained by the known extrusion and orientation processes to a temperature of from about 70 to about 100° C. for a very short time and then quickly cooling it down to a temperature below room temperature, preferably below about 20° C. In particular, heating of the film should last for a time at least sufficient to induce a decrease of the maximum transverse shrink force of the film to a value not exceeding 0.5 N/cm but not long enough to substantially affect the film % free shrink at 120° C. Typically the heating time is comprised between about 0.1 and about 7.5 s.

A further specific object of the present invention is therefore a method of selectively reducing the transverse shrink force of a heat-shrinkable film comprising a core layer comprising an ethylene-vinyl alcohol copolymer, two outer layers of blends comprising ethylene-vinyl acetate and ethylene-α-olefin copolymers, and two adhesive layers, to a value not exceeding 0.5 N/cm throughout its range of shrink temperatures, while maintaining substantially unaffected the % free shrink of the film at 120° C., which comprises heating the film obtained by the known extrusion and orientation processes and having a transverse shrink force higher than 0.5 N/cm to a temperature of from about 70 to about 100° C. for a time sufficient to induce a decrease of the maximum transverse shrink force of the film to a value not exceeding 0.5 N/cm without substantially affecting the film % free shrink at 120° C. and then quickly cooling it down to a temperature below room temperature, preferably below about 20° C.

In a preferred embodiment of the above method the heating time is of from about 0.1 to about 7.5 s.

The heat treatment according to the present invention might be carried out off-line, but preferably it is performed right on the line of all other processing operations.

When a film according to the invention is desired which has been cross-linked, the heat-treatment may be carried out either before or after cross-linking, otherwise it is carried out, after orientation, on the flattened tubular film collected by the upper nip rolls before the film is wound up or on the mono-ply film obtained after sitting the tubular one.

Measurement of the temperature of a film is generally difficult mainly when the film web is traveling at high speed through a continuous film production line. However the thermal capacity of the films according to the present invention is such that they rapidly attain the temperature of the environment particularly when heated by direct contact with a heat source, such as a heated plate or roller. Accordingly, for the purpose of the present invention, the heat treatment temperature is defined as the temperature of the heated elements with which the films are contacted or the ambient temperature to which the films are exposed during the treatment. In practice the films may be heated to the treatment temperature by conventional techniques, such as, by exposure of the film to radiant elements, by passage of the film through a heated air oven or an IR oven, or—preferably—by contact of the films with the surface of one or more heated plates or rollers.

According to a preferred embodiment the heat treatment is carried out by first running the film over and in contact with the surface of 2 to 8, preferably 4 or 6, revolving rollers heated at the suitably selected temperature, and then over and in contact with the surface of 2 to 4 rollers cooled to a temperature below room temperature.

The rollers are typically disposed, as described in the attached FIG. 1, on two vertical rows, whereas rollers (1), (3), (5), and (7) are mounted on a support member (9) by means of supporting bars (11), (13), (15) and (17) and rollers (2), (4), (6), and (8) are mounted on a similar support member (10) by means of supporting bars (12), (14), (16) and (18). While support (10) is fixed, support member (9), and rollers (1), (3), (5), and (7) jointly thereto, can be moved along the axis (19) to approach support member (9).

On each support member the distance between two subsequent rollers is larger than the rollers' diameter and the rollers mounted on one support member are shifted with respect to those mounted on the other support member so that by reducing the distance between the two support members the row of rollers (1), (3), (5), and (7) can come closer, align, or even go beyond that of rollers (2), (4), (6), and (8).

The film (20) is driven through this unit at a speed which generally corresponds to the speed of the production line.

Lower speeds may be envisaged but economic considerations would discourage this possibility.

The contact time of the film with the heating and cooling rollers, and therefore the length of the heating time and that of the cooling time will depend on the rollers diameters, on the speed line, and on the distance between the two rollers' rows. As a matter of fact, for a given line speed and rollers' diameter, the closer the two rows the longer is clearly the contact time.

The roller' dimensions can be widely varied in diameter while their length is determined by the width of the film which has to be subjected to the heat-treatment. Typically, to avoid heat dispersion on the rollers' sides and therefore an unsuccessful heat-treatment on the film edges, the roller' length will be larger than the film width.

The roller' diameter typically range from 10 to 100 cm, and generally is comprised between 10 and 40 cm. The rollers are typically made of stainless steel, but any material which is highly heat conductive and heat-resistant and which the thermoplastic material does not stick to could in theory be employed.

The heating or cooling system may be provided e.g. by the use of internal spirals where a heated or cooled medium is circulated.

The heating temperature should not be higher than about 100° C. and is preferably comprised between about 70 and about 95° C. and even more preferably between about 72 and about 90° C.

As indicated above in order to get the films according to the present invention the period for which the film is maintained at the heating treatment temperature must be very short and in most of the cases, it should not exceed 7.5 s. An extended period at the heat treatment temperature would in fact be detrimental to the film characteristics, unacceptably decreasing the free shrink of the film at 120° C. The minimum period of heat treatment of the film in order to achieve the desired results can be as low as 0.1 s, depending on the film thickness, specific composition and shrink properties of the starting film. Typically however a period of time of at least 0.5 and preferably at least 1 s and not more than 5, preferably not more than 3 s, is employed.

The cooling step that immediately follows the heat treatment, is then carried out as quickly as possible.

Generally the temperature of the film needs to be brought to a value below room temperature in less than 2 s, preferably in less than 1 s.

While the temperature of the cooling rollers could be as low as possible, using appropriate fluids with a freezing point below 0° C., it is generally preferred, in order to avoid condensation on the roller, cooling the rollers to a temperature of between 1 and 25° C. preferably between 8 and 20° C.

It is however possible for the person with an ordinary skill in this art to easily adjust the heating and cooling temperatures and the contact times, in relation with the configuration of the heat treating unit and of the process (e.g. the number of rollers, their distance, their diameter, the line speed, whether the film is passed through the unit in the form of a flattened tubular or of a monopoly film, etc.) and film characteristics (film thickness, film composition, shrink force of the starting film, etc.), within the above indicated ranges, by trial and error.

During the above heat treatment the film generally does not need to be constrained against shrinkage.

Using in fact the preferred system for carrying out the heat treatment wherein the film web is almost tensioned by the process itself on its passing through the system of rollers at a relatively high speed, a tolerable reduction in the film width occurs, generally of not more than 15–20%, which reflects in a slight thickening of the film.

However all these variations can be calculated depending on the temperature of the heat-treatment and the speed of the line and taken into account at the extrusion and orientation of the starting film so that a film having the required width and thickness is obtained after the heat-treatment.

Sometimes, and mainly when the heat treatment is carried out by passing the film through a heated oven, it may be advisable and easily achievable to avoid film shrinkable during the treatment by maintaining the film at substantially constant linear dimensions e.g. by a series of moving pinches holding the film edges, or by using a frame of the suitable dimensions.

Films treated according to the present invention may then be subjected to conventional after treatments—for example exposure to a corona discharge treatment to improve the bonding and print-receptive characteristics of the film surface.

The following examples are representative of the preferred embodiments of the present invention.

In order to evaluate such films the following tests were employed:

% Free Shrink (or % unrestrained linear thermal shrinkage), i.e. the percent dimensional change in a 10 cm×10 cm specimen of film when subjected to a selected heat, has been measured by the ASTM Standard Test Method D 2732-83, using an oil bath heated in this case at 120° C. and immersing the specimen therein for 5 s.

Gloss, i.e the surface reflectance or shine of a film specimen has been evaluated by ASTM Standard Test Method D-2457 (with an angle of incidence of 60° C.).

Haze, i.e. the percentage of transmitted light which is scattered forward while passing through the film specimen has been measured by the ASTM Standard Test Method D-1003 (Method A).

Finally, the transversal shrink force, i.e. the force per original unit width developed by a film in the transverse direction at a specified temperature in its attempt to shrink while under restraint, has been measured by an internal test method which is described in details herein below.

A 25.4 mm wide and 140 mm long strip of film is cut from the sample in the transverse direction. The force measurement is made by a load cell on which a clamping jaw is connected. Opposed to this jaw, a second one on which the specimen is fixed, can be adjusted in position by an external hand knob to pretension the specimen. The two jaws keep the specimen in the center of a channel into which an impeller blows heated air. In the air channels three thermocouples are fixed to measure the temperature. The temperature of the specimen, as measured by the thermocouples, is increased at a rate of about 2° C./s up to about 180° C. and the force is measured continuously. The measured force is then divided by the specimen original width to obtain the shrink force. Typically the shrink force is expressed in N/cm.

The maximum value of the transverse shrink force at a temperature of from room temperature to 180° C. is shown for the films according to the present invention and the corresponding film which has not been similarly heat-treated (Film A) in Table II.

Also reported in the same Table are the % free shrink values, measured by ASTM D-2732, at 120° C. in both dimensions, and the films' haze and gloss.

Preparation of the Comparative Film (Film A)

A five-ply film was prepared by following substantially the same procedure described in Example 1 of EP-B-217,596.

Schematically, the structure of this five-ply film was A/B/C/B/A wherein A was a blend of 25% EVA, 25% LMDPE, and 50% LLDPE containing slip, antiblock, and antifog agents, C was a blend of EVOH and a polyamide, and B was a modified LLDPE based adhesive.

The overall thickness of the film was 25 μ.

The manufacturing process corresponded to that described in the above referred Example and the shrink properties of the thus obtained film [maximum Shrink Force in the transverse direction (N/cm) and % Free Shrink at 120° C.] are reported in Table II, first line. The same Table also reports the haze and gloss values.

EXAMPLES 1 TO 8

In order to prepare the films of Examples 1 to 5, the same procedure described above was first followed, with the only difference that, to compensate for an increase of the film thickness during the subsequent heat treatment, the line speed was increased so as to maintain the thickness of the end heat-treated film at 25 μ.

The heat treatment according to the present invention was carried out by passing the tubular flattened film thus obtained through a processing unit consisting of 6 stainless steel Gross Equatherm heated rollers and two cooled rollers, 16 cm in diameter and 203 cm in length, disposed as described in FIG. 1. The unit was divided into four zones, three heating and one cooling zone. The first heating zone comprised the first roller, the second heating zone comprised the second and third roller and the third heating zone comprised the fourth, fifth, and sixth roller. The temperature of the roller(s) in each zone was the same and the temperature values of the four zones were as reported in Table I below. The revolving speed of the rollers was the same as the line speed (55 m/min).

In all these examples the rollers were disposed in such a way that the contact time of the film web with each roller was 0.26 s and the total heating time was therefore 1.56 s.

TABLE I

| | Temperature (° C.) | | | |
|---|---|---|---|---|
| Example No. | 1st zone | 2nd zone | 3rd zone | 4th zone |
| 1 | 90 | 90 | 70 | 12 |
| 2 | 70 | 90 | 70 | 20 |
| 3 | 90 | 90 | 60 | 20 |
| 4 | 70 | 90 | 60 | 12 |
| 5 | 100 | 95 | 80 | 12 |
| 6 | 85 | 84 | 75 | 20 |
| 7 | 83 | 80 | 73 | 20 |
| 8 | 80 | 75 | 72 | 20 |

TABLE II

| Example No. | % Shrink at 120° C. | | Max. Transv. Shrink Force (N/cm) | Haze | Gloss |
|---|---|---|---|---|---|
| | L | T | | | |
| Film A | 60 | 60 | 0.83 | 6.6 | 112 |
| 1 | 55 | 49 | 0.44 | — | — |
| 2 | 56 | 53 | 0.43 | 6.5 | 109 |
| 3 | 57 | 49 | 0.42 | 6.4 | 108 |
| 4 | 53 | 52 | 0.49 | 7.1 | 107 |
| 5 | 60 | 50 | 0.36 | 5.8 | 110 |
| 6 | 59 | 58 | 0.46 | 6.0 | 114 |
| 7 | 63 | 59 | 0.48 | 5.6 | 114 |
| 8 | 62 | 60 | 0.50 | 5.4 | 116 |

A sample of Film A was passed into a hot air oven heated at a temperature of 115° C. for 2 s. The thus obtained film showed a remarkable reduction in the maximum shrink force (<0.3 N/cm) coupled however with a net loss in free shrink (≦20% at 120° C. in both dimensions) and a worsening of the film optical properties (a reduction by more than 20% in the film gloss).

Some representative films according to the present invention, the films of Examples 6 and 7, have been evaluated in packaging tests on a Horizontal Form Fill and Seal (HFFS) machine (Ilapak Delta 2000 SB) under identical operating conditions using standard trays for MAP applications (all taken from the same batch to avoid inconsistency between batches) and directly compared with Film A.

The results obtained in these tests showed that the heat-treated films according to the present invention reduced tray distortion by more than 50% (in mm) with respect to comparative Film A, thus remarkably improving the appearance of the package.

What is claimed is:

1. A heat-shrinkable film comprising:
   a) core layer comprising an ethylene-vinyl alcohol copolymer;
   b) two outer layers comprising a blend of ethylene-vinyl acetate copolymer and ethylene-α-olefin copolymer; and
   c) two adhesive layers, wherein said film has
      i) a free shrink of at least 40% in both directions at 120° C. and
      ii) a maximum shrink force in the transverse direction, throughout its range of shrink temperatures, not exceeding 0.5 N/cm.

2. A heat-shrinkable film according to claim 1 wherein the core layer comprises a blend of ethylene-vinyl alcohol copolymer and polyamide.

3. A heat-shrinkable film according to claim 1 wherein the outer layers comprise a blend of ethylene-vinyl acetate copolymer, and a first and a second ethylene-α-olefin copolymer.

4. A heat-shrinkable film according to claim 3 wherein
   a) the core layer comprises a blend of ethylene-vinyl alcohol copolymer and polyamide; and
   b) the outer layers comprise a blend of an ethylene-vinyl acetate copolymer, an ethylene-α-olefin copolymer of low density and an ethylene-α-olefin copolymer of medium density,
   wherein said film has a free shrink in both directions at 120° C. of at least 45%.

5. A heat-shrinkable film according to claim 4 wherein the core layer comprises a blend of an ethylene-vinyl alcohol copolymer and a polyamide, and the film is cross-linked.

6. A heat-shrinkable film according to claim 1 wherein the film has a thickness of from about 15 to about 150 micrometers.

7. A heat-shrinkable film according to claim 6 wherein the film thickness is between 18 and 90 micrometers.

8. A heat-shrinkable film according to claim 1 wherein the film has a free shrink of at least 45% in both directions at 120° C.

9. A heat-shrinkable film according to claim 1 wherein the film has a free shrink of at least 50% in both directions at 120° C.

* * * * *